US007865762B2

(12) United States Patent
Swanson

(10) Patent No.: US 7,865,762 B2
(45) Date of Patent: Jan. 4, 2011

(54) METHODS AND APPARATUS FOR HANDLING ERRORS INVOLVING VIRTUAL MACHINES

(75) Inventor: Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 11/950,343

(22) Filed: Dec. 4, 2007

(65) Prior Publication Data

US 2009/0144579 A1   Jun. 4, 2009

(51) Int. Cl.
*G06F 11/00* (2006.01)
(52) U.S. Cl. .......................................................... 714/2
(58) Field of Classification Search ....................... 714/2
See application file for complete search history.

(56) References Cited

U.S. PATENT DOCUMENTS

| | | | | |
|---|---|---|---|---|
| 7,039,008 | B1 * | 5/2006 | Howes et al. ................ | 370/220 |
| 7,213,246 | B1 * | 5/2007 | van Rietschote et al. ........ | 718/1 |
| 7,418,584 | B1 * | 8/2008 | Klaiber et al. .............. | 712/229 |
| 2004/0172574 | A1 * | 9/2004 | Wing et al. ..................... | 714/4 |
| 2005/0289540 | A1 * | 12/2005 | Nguyen et al. ................. | 718/1 |
| 2006/0005084 | A1 * | 1/2006 | Neiger et al. ................. | 714/47 |
| 2006/0085670 | A1 * | 4/2006 | Carver et al. ..................... | 714/5 |
| 2007/0005860 | A1 * | 1/2007 | Lu et al. ...................... | 710/260 |
| 2007/0061634 | A1 * | 3/2007 | Marisetty et al. ............... | 714/48 |
| 2007/0094659 | A1 * | 4/2007 | Singh et al. ...................... | 718/1 |
| 2007/0220332 | A1 * | 9/2007 | Marisetty et al. ............... | 714/30 |
| 2007/0226214 | A1 * | 9/2007 | Smits ............................ | 707/7 |
| 2008/0126834 | A1 * | 5/2008 | Sankaran et al. ................ | 714/4 |
| 2008/0140846 | A1 * | 6/2008 | Rehm .......................... | 709/227 |
| 2008/0141077 | A1 * | 6/2008 | Swanson et al. ............... | 714/48 |
| 2009/0094603 | A1 * | 4/2009 | Hiltgen et al. .................. | 718/1 |
| 2009/0138896 | A1 * | 5/2009 | McKenney et al. .......... | 719/318 |

OTHER PUBLICATIONS

Intel Corporation, White Paper, "Enhanced Virtualization on Intel® Architecture-based Servers," Copyright 2006 (http://www.intel.com/business/bss/products/server/virtualization_wp.pdf).

* cited by examiner

*Primary Examiner*—Bryce P Bonzo
(74) *Attorney, Agent, or Firm*—D'Ann Naylor Rifai

(57) ABSTRACT

A virtual machine monitor (VMM) in a data processing system handles errors involving virtual machines (VMs) in the processing system. For instance, an error manager in the VMM may detect an uncorrectable error in involving a component associated with a first VM in the processing system. In response to detection of that error, the error manager may terminate the first VM, while allowing a second VM in the processing system to continue operating. In one embodiment, the error manager automatically determines which VM is affected by the uncorrectable error, in response to detecting the uncorrectable error. The error manager may also automatically spawn a new VM to replace the first VM, if the processing system has sufficient resources to support the new VM. Other embodiments are described and claimed.

19 Claims, 2 Drawing Sheets

METHODS AND APPARATUS FOR HANDLING ERRORS INVOLVING VIRTUAL MACHINES

FIELD OF THE INVENTION

The present disclosure relates generally to the field of data processing, and more particularly to methods and related apparatus for handling errors involving virtual machines.

BACKGROUND

A data processing system may include hardware resources, such as a central processing unit (CPU), random access memory (RAM), read-only memory (ROM), etc. The processing system may also include software resources, such as a basic input/output system (BIOS), a virtual machine monitor (VMM), and one or more operating systems (OSs). When the computer system is started or reset, it may load the BIOS, and then the VMM. The VMM may include the control logic necessary for interacting with hardware without an underlying host OS. Alternatively, a host OS may be started, and then the VMM may be launched on top of the host OS. The VMM may create and manage one or more virtual machines (VMs), and the VMs may boot to different guest OSs or to different instances of the same guest OS. One or more guest VMs may provide the VMM with facilities for managing certain aspects of the processing system pertaining to virtualization. Such a guest VM may be referred to as a service VM, and the OS in a service VM may be referred to as a service OS.

Thus, a VMM may allow multiple OSs and applications to run in independent partitions or execution environments. The article entitled "Intel® Virtualization Technology for Directed I/O," in issue no, 03, volume no. 10, of the Intel® Technology Journal (the "VT-d article") provides additional information about some virtualization frameworks. The VT-d article is currently available from the Internet at http://download.intel.com/technology/itj/2006/v10i3/v10-i3-art02.pdf.

The CPU in a data processing system may provide hardware support (e.g., instructions and data structures) for virtualization. Additional details about virtualization may be found in reference manuals such as (a) Intel® Virtualization Technology Specification for the IA-32 Intel® Architecture, dated April 2005 (the VT-x specification"); and (b) IA-32 Intel® Architecture Software Developer's Manual, Volume 2B: Instruction Set Reference, N-Z, dated June 2006. Furthermore, different types of processors may provide different features for supporting virtualization.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
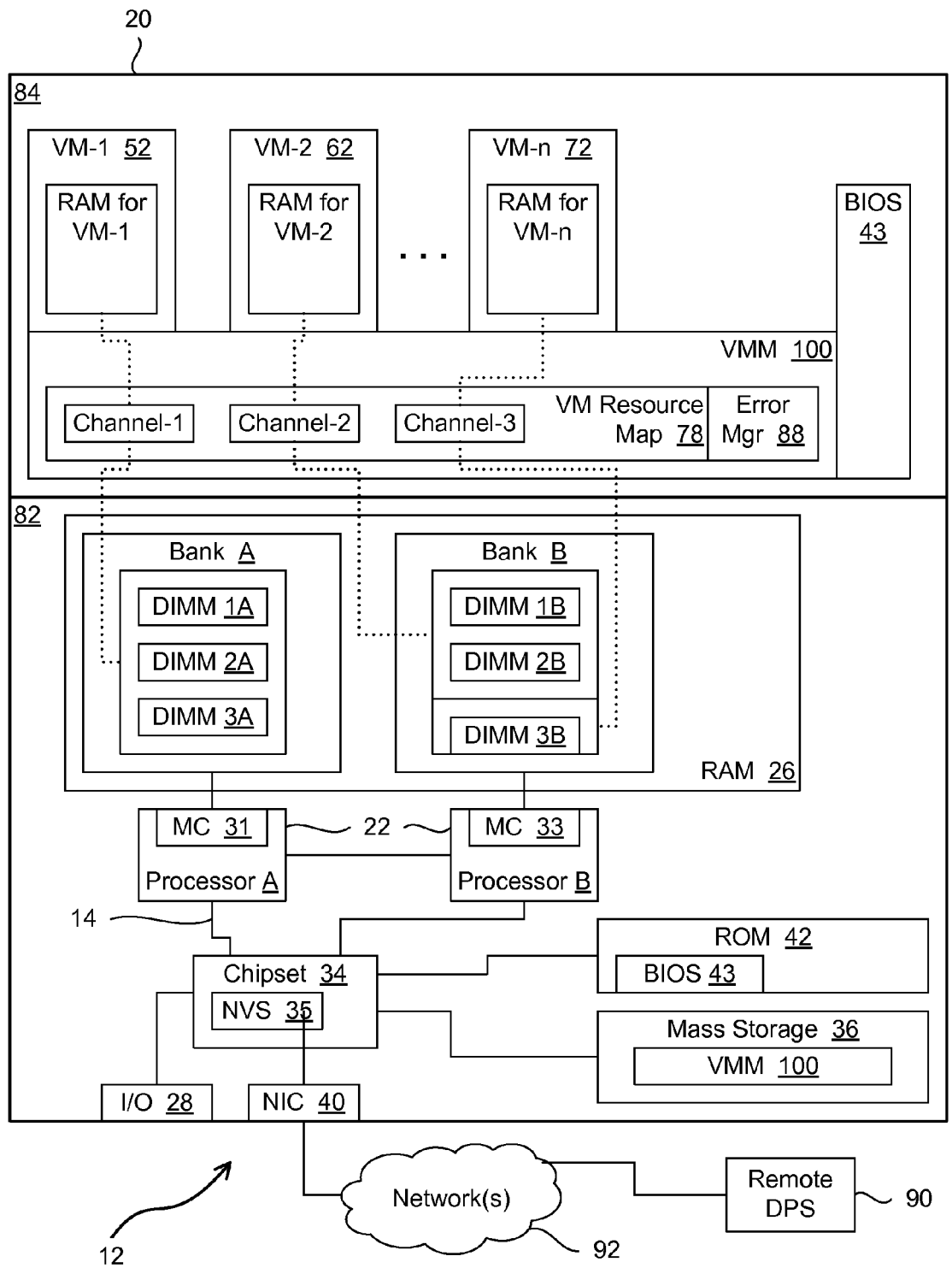
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware components 82, such as one or more CPUs or processors 22, along with various other components, which may be communicatively coupled via one or more system buses 14 or other communication pathways or mediums. This disclosure uses the term "bus" to refer to shared communication pathways, as well as point-to-point pathways. Each processor may include one or more processing units. The processing units may be implemented as processing cores, as Hyper-Threading (HT) technology, or as any other suitable technology for executing multiple threads simultaneously or substantially simultaneously. In the embodiment of FIG. 1, processing system 20 includes two processors, referred to as processor A and processor B. Alternative embodiments may use a single processor, or more than two processors.

In the embodiment of FIG. 1, processors A and B are communicatively coupled to one or more volatile or non-volatile data storage devices, such as RAM 26, ROM 42, mass storage devices 36 such as hard drives, and/or other devices or media, such as floppy disks, optical storage, tapes, flash memory, memory sticks, digital versatile disks (DVDs), etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processor A and/or B may also be communicatively coupled to additional components, such as a video controller, integrated drive electronics (IDE) controllers, small computer system interface (SCSI) controllers, universal serial bus (USB) controllers, input/output (I/O) ports 28, input devices, output devices such as a display, etc. A chipset 34 in processing system 20 may serve to interconnect various hardware components. Chipset 34 may include one or more bridges and/or hubs, as well as other logic and storage components.

In the embodiment of FIG. 1, processor A includes a memory controller 31, processor B includes memory controller 33, and processing system 20 is configured to use non-uniform memory access (NUMA). Memory controller 31 provides processor A with access to a bank of memory modules referred to as bank A. Similarly, memory controller 33 provides processor B with access to memory bank B. Each bank may include one or more memory modules. In FIG. 1, bank A includes three dual in-line memory modules (DIMMs) labeled 1A, 2A, and 3A, while bank B include three DIMMs labeled 1B, 2B, and 3B. In other embodiments, other numbers and types of memory modules may be used. Also, other memory access techniques, (e.g., symmetric multiprocessing or SMP) may be used in other embodiments.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems 90, such as through a network interface controller (NIC) 40, a modem, or other communication ports or couplings. Processing systems may be interconnected by way of a physical and/or logical network 92, such as a local area network (LAN), a wide area network (WAN), an intranet, the Internet, etc. Communications involving network 92 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Some components may be implemented as adapter cards with interfaces (e.g., a peripheral component interconnect (PCI) connector) for communicating with a bus. In some embodiments, one or more devices may be implemented as embedded controllers, using components such as programmable or non-programmable logic devices or arrays, application-specific integrated circuits (ASICs), embedded processors, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 84. The software environment 84 may include BIOS components 43, system management mode (SMM) components, OS components, VMM components, user applications, etc. For example, some or all of the control logic or code to implement a BIOS 43 may be stored in ROM 42, and some or all of the code to implement a VMM 100 may be stored in mass storage 36. When processing system 20 starts, it may load code into RAM 26 and execute the code to create one or more execution environments.

The term "VMM" refers to the control logic that spawns and manages virtual machines. Some VMMs run on top of a host OS. Other VMMs run directly on the hardware without an underlying host OS. The term "hypervisor" refers to a VMM that runs without an underlying host OS. In one embodiment, some of the control logic for managing VMs resides in a hypervisor, and other control logic resides in one of the virtual machines. A virtual machine with control logic for managing other VMs may be referred to as a parent node VMM or a service VM.

The embodiment of FIG. 1 depicts an example software environment resulting after BIOS 43 and VMM 100 have been launched, and after VMM 100 has launched a number of VMs, depicted as VM-1 52, VM-2 62, and VM-n 72. As illustrated, VMM 100 includes an error manager 88, as well as a VM resource map 78. As explained in greater detail below, error manager 88 handles errors involving the VMs. In other embodiments, the VM resource map and/or the error manager may reside in a parent node VMM, or in any other suitable partition.

VM resource map 78 includes information identifying which resources have been allocated to which VMs. For instance, VM resource map 78 includes data indicating that VMM 100 has assigned DIMMs 1A, 2A, and 3A to a specific channel (i.e., channel-1), and that channel has been allocated for use by VM-1. The dashed lines connecting to channel 1 reflect this relationship. Similarly, channel 2 includes DIMMs 1B and 2B, which have been allocated to VM-2, while channel-3 includes DIMM 3B, which has been allocated to VM-n.

VM resource map 78 may include additional information to identify other components associated with particular VMs. For instance, VM resource map 78 may indicate which processors or processing units have been allocated to which VMs, and which other resources (e.g., NICs, video controllers, etc.) have been allocated to each VM.

Processing system 20 may be a single server that uses virtualization to create multiple VMs which operate like multiple servers, each having its own function. (E.g., see the whitepaper entitled "Enhanced Virtualization on Intel® Architecture-based Servers," which is currently available from www.intel.com/business/bss/products/server/virtualization_wp.pdf). In a conventional system, such consolidation can exacerbate problems, in that, if one physical server encounters an uncorrectable error, the error may cause all virtual servers to stop working. Typically, if a fatal memory error occurs on a system, the OS logs the error and issues a non-maskable interrupt (NMI), which causes the system to hang or reset. When this happens on a server that is using virtualization, the system crash affects all virtual servers owned by the VMM, which can lead to data center instability.

By contrast, VMM 100 in processing system 20 can trap uncorrectable errors from the hardware components and map those errors to affected virtual machines. Furthermore, when an uncorrectable error occurs, VMM 100 turns off or "bug checks" only the virtual machines affected by the uncorrectable error, while the remaining VMs continue normal operation. In addition, VMM 100 may use counters to allow previously failed hardware to be utilized again for future VM creation, until the counters exceed a particular threshold.

As shown in FIG. 1, the memory controllers are included in the processor packages. As explained in greater detail below, when an uncorrectable memory error occurs, the corresponding memory controller will generate a machine check exception (MCE) and a system management interrupt (SMI) local to the processor package. The BIOS or hardware will synchronize the other processors in the system and log the error and give control back to the host OS or hypervisor without asserting a non-maskable interrupt (NMI). Since the memory controller is encapsulated within the processor package, a processor MCE will occur and a machine check handler in the OS or the hypervisor will take control. Utilizing configuration space registers (CSRs) and machine specific registers (MSRs), the machine check handler will determine which DIMM created the error. The processor may execute these operations in non-lockstep mode. Based upon a memory map obtained from the BIOS, the machine check handler can determine the physical address of the error; and based on the VM resource map, the machine check handler can map that physical address to a given VM. All VMs operating without error may continue to operate, and the data center operations can continue.

In addition, this approach is expandable at least to all silicon level features incorporated into the encapsulated silicon which is redundant like the memory controller within the processor. In other words, processor errors that affect only a single core can also be isolated and ignored. Similarly, disk I/O errors associated only with a particular VM can be isolated and addressed without affecting the other VMs. In addition, the VMM may interpret the isolated errors as an early warning that underlying hardware may be failing, and in response the VMM may route critical VM operations to another processing system. As a result, the affected server can still operate, even if in a degraded state, until such a time that the affected server can be repaired, such as during the next scheduled maintenance.

Figure 2:
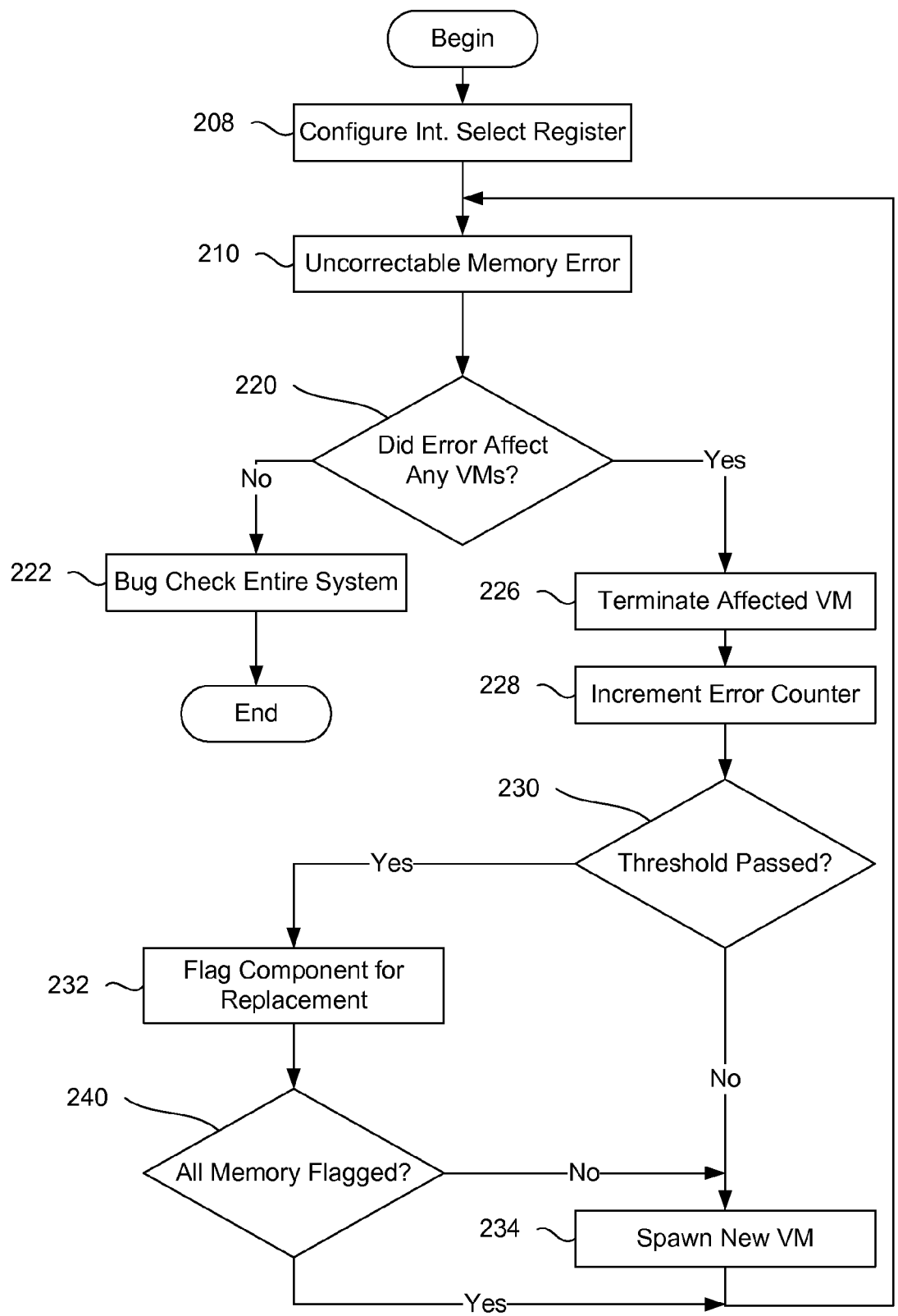
FIG. 2 is a flowchart of an example embodiment of a process for handling errors involving virtual machines in the processing system of FIG. 1.

FIG. 2 is a flowchart of an example embodiment of a process for handling errors involving VMs in processing system 20. The illustrated process begins after processing system 20 has booted, and VMM 100 has spawned VM-1, VM-2, and any other VMs, up to and including VM-n. In addition, VMM 100 will have populated VM resource map 78 with data to indicate which resources have been allocated to which VMs. For instance, that data may indicate that channel-1 constitutes the RAM for VM-1, and that channel-1 encompasses DIMM 1A, DIMM 2A, and DIMM 3A. Similarly, VM resource map 78 may link DIMM 1B and DIMM 2B to VM-2 via channel-2, and may link DIMM 3B with VM-n via channel-3. Furthermore, VMM 100 may have configured the interrupt select registers to prevent BIOS 43 from generating SMIs in response to MCEs, as shown at block 208.

As depicted at block 210, after processing system 20 has been configured and the VMs are running, an uncorrectable error occurs, resulting in generation of an MCE. For instance, the RAM for VM-1 may have suffered an uncorrectable error. In response to the MCE, error manager 88 determines whether the error is limited to on or more VMs, as shown at block 220. For instance, error manager 88 may use MSR and CSR registers in the processor along with a memory map obtained from the BIOS to determine the physical address of the error. Then, error manager 88 may use VM resource map 78 to determine which VMs, if any, are using that physical address. Thus, error manager 88 maps the uncorrectable error to the VM(s) that is actually using that portion of RAM.

For errors in processors and integrated memory controllers, the type of error that has occurred may be described to the OS via an MCERR (machine check error) bus signal. In addition, ACPI (advanced configuration and power interface) tables can be defined to map to other types of errors (e.g., non-architected errors or errors outside of the processor). For example, if an error were to happen on a SAS (serial attached SCSI (small computer system interface)) controller, the BIOS could tell the OS about the error via ACPI and assertion of a system control interrupt (SCI). This way the VMM or hypervisor can effectively stop operation of the affected VM.

As depicted at block 222, if the error was not limited to the VMs, error manager 88 may issue an NMI to bug check the entire system, and the entire system may then hang or reset. For example, if error manager 88 cannot map the error, the error may have occurred in a BIOS-owned area or some other critical areas, which may make continue operation unsafe.

However, if the error is limited to a VM (or to multiple VMs), error manager 88 may terminate only the affected VM or VMs, as shown at block 226. All other VMs may continue to operate, and the data center operations can continue. For instance, if error manager 88 detects an error in the RAM in channel-1, error manager 88 can terminate VM-1, while VM-2 and VM-n continue to operate. In one embodiment, instead of terminating the affected VM, error manager 88 may emulate a conventional bug check for that VM.

In addition, as shown at block 228, error manager 88 may increment one or more error counters to keep track of how many errors have affected each different hardware component in processing system 20.

As depicted at block 230, error manager 88 may then determine whether any of the error counters have exceeded a predetermined threshold. For instance, error manager 88 may be configured to allow no more than ten errors per DIMM in a twenty-four hour period. As long as the predetermined threshold has not been exceeded, it may be assumed that the failure is not persistent, but is a rare or intermittent phenomenon resulting from the speed of the part, the heat of the part, associated heat dissipation, etc. Thus, error manager can avoid flagging parts for replacement unnecessarily. For instance, if memory asserts a multi-bit error, it is the exception rather than the rule that the DIMM is bad.

As shown at block 232, if the error threshold for any particular component has been passed, error manager 88 may flag that component for replacement. For instance, if DIMM 1A (or a portion of DIMM 1A) continues to fail after a set number of times within a set time period, VMM 100 would not use DIMM 1A (or the bad portion of DIMM 1A) for future VM creation, and VMM 100 can mark DIMM 1A as a field replacement unit (FRU) to be replaced on the next server maintenance cycle.

As shown at block 240, error manager 88 may then determine whether or not there are sufficient good resources to launch a new VM, where the good resources may include unused resources, as well as resources (e.g., memory) that suffered one or more errors, as long as the number of errors has not exceeded the error threshold. As shown at block 234, if there are sufficient good resources, or if the error threshold has not been passed, error manager 88 may spawn a new VM (or multiple VMs) to handle the workload from the terminated VM(s). The new VM(s) and the VMs that were not affected by the error may then continue to operate, at least until another uncorrectable error occurs. However, if there are not sufficient resources to spawn a new VM, error manager 88 may simply allow the remaining VMs to continue running.

Since processing system 20 can automatically spawn new VMs to replace VMs that experienced errors, processing system 20 can be referred to as self healing. For instance, if the error affected VM-1, and VM-1 was operating as a mail server, error manager 88 could terminate VM-1 in response to the error, and then launch a new VM to serve as the mail server. As described above, the error manager may prevent errors in resources that are only tied to one or more VMs from taking down the entire VMM and causing catastrophic data center down time.

In light of the principles and example embodiments described and illustrated herein, it will be recognized that the illustrated embodiments can be modified in arrangement and detail without departing from such principles. For instance, although the text above refers frequently to memory errors, the teachings herein may be used to handle other types of non-correctable errors as well, including without limitation data errors in processing units, errors in PCI or component level devices, etc. For example, an SAS or an SATA (serial advanced technology attachment) device, a NIC, or another piece of silicon that can assert an error. BIOS can describe the error to the OS/VMM/hypervisor in the context of the ACPI hardware mapping. Since the OS/VMM/hypervisor is keeping track of what resources are associated with a given piece of hardware, the OS/VMM/hypervisor can effectively determine the risk or impact of a given error.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. The control logic for providing the functionality described and illustrated herein may be implemented as hardware, software, or combinations of hardware and software in different embodiments.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other platforms or devices for processing or transmitting information.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
   detecting an uncorrectable error in a processing system having first and second virtual machines (VMs), the uncorrectable error involving a component associated with the first VM;
   in response to detection of the uncorrectable error, terminating the first VM, and allowing the second VM to continue operating; and
   configuring an interrupt select register for a basic input/output system (BIOS) in the processing system to not issue a system management interrupt (SMI) in response to a machine check exception.

2. A method according to claim 1, comprising:
   in response to detecting the uncorrectable error, automatically determining which VM is affected by the uncorrectable error, and
   terminating the first VM in response to a determination that the VM affected by the uncorrectable error is the first VM.

3. A method according to claim 1, further comprising:
   in response to detecting the uncorrectable error, automatically determining whether the processing system has sufficient resources to support a new VM; and
   in response to determining that the processing system has sufficient resources to support the new VM, spawning the new VM.

4. A method according to claim 1, further comprising:
   in response to detecting the uncorrectable error, automatically spawning a new VM; and
   launching software in the new VM to support a function formerly served by the first VM.

5. A method according to claim 1, wherein the uncorrectable error involving the component associated with the first VM comprises:
   a memory error in a memory module used by the first VM.

6. A method according to claim 1, wherein the uncorrectable error involving the component associated with the first VM comprises:
   a data error in a processing unit used by the first VM.

7. An apparatus comprising:
   a tangible, machine-accessible medium; and
   instruction in the machine-accessible medium, wherein the instructions, when executed by a processing system having first and second virtual machines (VMs), cause the processing system to perform operations comprising:
   detecting an uncorrectable error involving a component associated with the first VM;
   in response to detection of the uncorrectable error, terminating the first VM, and allowing the second VM to continue operating; and
   configuring an interrupt select register for a basic input/output system (BIOS) in the processing system to not issue a system management interrupt (SMI) in response to a machine check exception.

8. An apparatus according to claim 7, wherein the operations comprise:
   in response to detecting the uncorrectable error, automatically determining which VM is affected by the uncorrectable error, and
   terminating the first VM in response to a determination that the VM affected by the uncorrectable error is the first VM.

9. An apparatus according to claim 7, wherein the operations comprise:
   in response to detecting the uncorrectable error, automatically determining whether the processing system has sufficient resources to support a new VM; and
   in response to determining that the processing system has sufficient resources to support the new VM, spawning the new VM.

10. An apparatus according to claim 7, wherein the operations comprise:
    in response to detecting the uncorrectable error, automatically spawning a new VM; and
    launching software in the new VM to support a function formerly served by the first VM.

11. An apparatus according to claim 7, wherein the uncorrectable error involving the component associated with the first VM comprises:
    a memory error in a memory module used by the first VM.

12. An apparatus according to claim 7, wherein the uncorrectable error involving the component associated with the first VM comprises:
   a data error in a processing unit used by the first VM.

13. A processing system comprising:
   first and second processing units;
   a first memory controller associated with the first processing unit;
   a second memory controller associated with the second processing unit;
   a first memory module responsive to the first memory controller;
   a second memory module responsive to the second memory controller;
   a machine-accessible medium; and
   a virtual machine error manager stored in the machine-accessible medium, the virtual machine error manager including control logic to perform operations comprising:
   detecting an uncorrectable error involving a component associated with a first VM in the processing system;
   in response to detection of the uncorrectable error, terminating the first VM, while allowing a second VM in the processing system to continue operating; and
   configuring an interrupt select register for a basic input/output system (BIOS) in the processing system to not issue a system management interrupt (SMI) in response to a machine check exception.

14. A processing system according to claim 13, wherein the virtual machine error manager comprises part of a virtual machine manager (VMM).

15. A processing system according to claim 14, wherein the VMM comprises a hypervisor.

16. A processing system according to claim 13, wherein the virtual machine error manager comprises control logic to perform operations comprising:
   in response to detecting the uncorrectable error, automatically determining which VM is affected by the uncorrectable error, and
   terminating the first VM in response to a determination that the VM affected by the uncorrectable error is the first VM.

17. A processing system according to claim 13, wherein the virtual machine error manager comprises control logic to perform operations comprising:
   in response to detecting the uncorrectable error, automatically determining whether the processing system has sufficient resources to support a new VM; and
   in response to determining that the processing system has sufficient resources to support the new VM, spawning the new VM.

18. A processing system according to claim 13, wherein the virtual machine error manager comprises control logic to perform operations comprising:
   in response to detecting the uncorrectable error, automatically spawning a new VM; and
   launching software in the new VM to support a function formerly served by the first VM.

19. A processing system according to claim 13, wherein the uncorrectable error involving the component associated with the first VM comprises an error selected from the group consisting of:
   a memory error in a memory module used by the first VM; and
   a data error in a processing unit used by the first VM.

* * * * *